Figure 1:
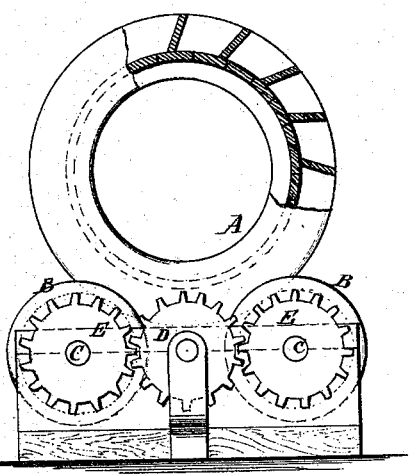
Figure 2:
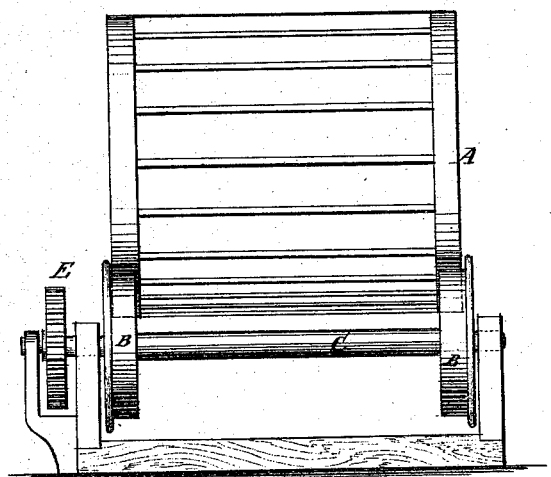

G. Miller,

Water Wheel.

No. 105,712.  Patented July 26, 1870.

Witnesses:
A. W. Almqvist
D. S. Mabee

Inventor:
Geo. Miller
per Munn & Co
Attorneys.

United States Patent Office.

GEORGE MILLER, OF PROVIDENCE, RHODE ISLAND.

Letters Patent No. 105,712, dated July 26, 1870.

IMPROVEMENT IN WATER-WHEELS.

The Schedule referred to in these Letters Patent and making part of the same.

*To all whom it may concern:*

Be it known that I, GEORGE MILLER, of Providence, in the county of Providence and State of Rhode Island, have invented a new and useful Improvement in Water-Wheels; and I do hereby declare that the following is a full, clear, and exact description thereof, which will enable others skilled in the art to make and use the same, reference being had to the accompanying drawing forming part of this specification.

This invention relates to improvements in water-wheels, and in the gearing for transmitting the power of the same.

It consists in mounting the large wooden or iron breast overshot or other wheels, commonly mounted on central shafts, on friction-rollers, and in transmitting the power through the medium of the said friction-wheels, geared together and arranged for gearing with suitable transmitting gear, the object being to simplify and cheapen the cost of the wheel and transmitting gear, as well as to reduce the friction of the bearings of the wheel.

A is the water-wheel, and

B, the rollers, on which it is supported, and by which the power is to be transmitted. It is arranged so that the faces of the end rims run on the faces of the wheels B.

The latter are arranged in pairs, one for each end of the water-wheel, and connected to shafts C, which are geared together at one or both ends by an intermediate wheel, D, gearing into wheels E on the said shafts.

This arrangement is applicable for large, heavy wheels, which will bear on the wheels B with such force as to prevent the wheel A from slipping, or, in other words, the friction of the wheel A on the wheels B must be greater than the power of the water on the wheel. This can be regulated by the size of the wheels B. The friction will be greater when the water is on the wheel.

The transmitting gearing may be connected in any manner, and with any one of the wheels E or D, as may be preferred.

This arrangement admits of a cheaper construction of the water-wheel than when the central shaft and the necessary arms for supporting it thereon are used, which have to be very strong and expensive, and the wheel will last longer, for in this way the power of it being given off at both ends, and at four different points, and these being where the wheel is supported, the strain is equally divided on the wheel, so that there are no twisting or cross-strains on it, as when the gearing is connected to one point on the rim.

The strain is also less than when the power is transmitted through the shaft.

The transmitting shaft, gearing with wheels E, will have a speed as high as if geared into a wheel on the shaft of the water-wheel, as ordinarily arranged, as large as the rim of the water-wheel.

Of course the wheel mounted in this way will have less friction than when mounted in the old way.

All these advantages are secured at less cost in first construction than the cost of the present arrangement, equal capacities being considered.

Having thus described my invention,

I claim as new and desire to secure by Letters Patent—

A water-wheel, mounted for its support and also for transmitting its power on rollers B, the axles of which are connected together by gearing, and arranged for gearing with transmitting mechanism, all substantially as specified.

GEORGE MILLER.

Witnesses:
ISAAC A. BROWNELL,
ALFRED B. IRONS.